W. H. SINGER.
COMMUTATOR TYPE DYNAMO ELECTRIC MACHINE.
APPLICATION FILED JUNE 13, 1910.
986,028.
Patented Mar. 7, 1911.
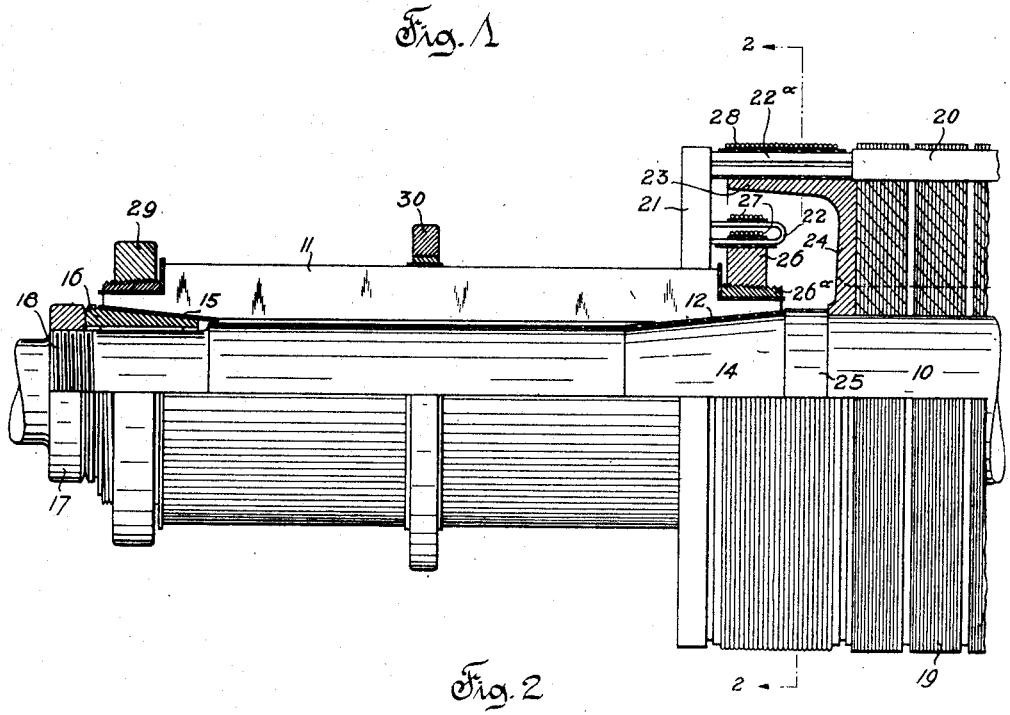
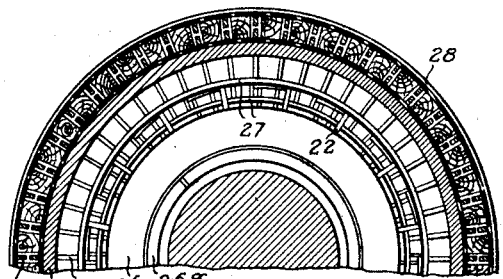

UNITED STATES PATENT OFFICE.

WILLIAM H. SINGER, OF WEST ALLIS, WISCONSIN, ASSIGNOR TO ALLIS-CHALMERS COMPANY, A CORPORATION OF NEW JERSEY.

COMMUTATOR-TYPE DYNAMO-ELECTRIC MACHINE.

986,028.  Specification of Letters Patent.  Patented Mar. 7, 1911.

Application filed June 13, 1910. Serial No. 566,537.

*To all whom it may concern:*

Be it known that I, WILLIAM H. SINGER, a citizen of the United States, residing at West Allis, in the county of Milwaukee and State of Wisconsin, have invented certain new and useful Improvements in Commutator-Type Dynamo-Electric Machines, of which the following is a full, clear, and exact specification.

My invention relates to dynamo-electric machines of the commutator type and particularly to retaining and supporting means for conductors of such machines.

In the manufacture of high speed dynamo-electric machines provision must be made for retaining conductors which are subjected to centrifugal force, particular attention being paid to firmly securing the segments of the commutator.

Various methods of commutator support have been adopted and are in use. Satisfactory results have been obtained by the use of retaining members, such as clamping rings, shrink rings, etc., which are mounted on and insulated from the segments of the commutator.

It is the object of this invention to simplify and render more compact and efficient the structure of a dynamo-electric machine of the commutator type. I accomplish this by employing a retaining ring for holding in place the segments of a commutator and also as a support for conductors, such as cross connectors, which join equi-potential points of the winding.

The various novel features of my invention will be described in the specification and particularly set forth in the appended claims.

Referring to the accompanying sheet of drawings, Figure 1 is a partial longitudinal sectional view of the rotating member of a dynamo-electric machine of the commutator type equipped with my invention; and Fig. 2 is a partial sectional view taken along line 2—2 of Fig. 1 looking in the direction indicated by the arrows.

A shaft 10 carries a commutator 11. The bars of the commutator 11 rest at one end on insulation 12 mounted on an inclined portion 14 of the shaft. The other ends of the bars rest on insulation 15 mounted on an inclined or cone-shaped seat 16, which may be moved longitudinally of the shaft. This seat which supports one end of the commutator and centers the latter relatively to the shaft, is held in place by a nut 17 which engages a threaded portion 18 of the shaft 10. Also mounted on the shaft 10 is a laminated core 19 which carries a winding 20. This winding is connected to the segments of the commutator 11 by leads 21. In order to connect equi potential points of the armature winding, cross connectors 22 have been provided which are secured to the leads 21.

The end portions 22$^a$ of the armature winding 20 are supported by annular projecting portions 23 of an end plate 24 which abuts a flange 25 on the shaft 10 for holding the laminated core in place. For retaining and supporting the segments of the commutator and supporting the cross-connectors 22 single means located between the core 19 and the cross connectors 22 is used in common. This single retaining and supporting means comprises a retaining member 26, preferably in the form of two concentric rings having engaging threaded portions, the inner ring 26$^a$ being split and the outer one solid. The engaging threaded portions are tapered so that there is a clamping action when the outer ring is screwed on the inner split ring. Again this retaining member may be in the form of a shrink ring. The retaining and supporting member 26 in whatever form it may be is mounted on and insulated from segments of the commutator. The cross connectors 22 are held in engagement with the retaining ring 26 by cording 27 which is wrapped around said cross connectors. The end portions 22$^a$ of the winding 20 are also retained by cording 28 which prevents their flying outward due to the action of centrifugal force. The commutator is further reinforced by other rings 29 and 30, the former being arranged similar to the ring 26 and the latter being located in the middle of the commutator. By means of this arrangement the commutator segments, the end portions of the winding 20, and the connectors 22 are held securely in a fixed position and they can easily withstand centrifugal forces developed by machines of high speeds of rotation.

By using a ring 26 for retaining in position the segments of the commutator and also for supporting the cross connectors, it is unnecessary to use an extra member, such as an arm, for supporting the cross connectors 22. This construction is simple, durable and reliable. No unnecessary parts such as a bulky supporting arrangement has to be provided which would decrease the ventilating space around the winding, leads and connectors.

There may be many modifications of the precise form and arrangement herein shown and described and I aim in my claims to cover all such modifications which do not involve a departure from the spirit and scope of my invention.

What I claim as new is:

1. In a dynamo-electric machine, the combination of a winding having cross connectors, a commutator, and a ring mounted on said commutator supporting said cross connectors.

2. In a dynamo-electric machine, the combination of a winding having cross connectors, a commutator, and a retaining member comprising concentric rings mounted on said commutator supporting said cross connectors.

3. In combination, a dynamo-electric machine, having a plurality of current carrying conductors of different descriptions, and a ring for retaining and supporting a plurality of said conductors.

4. In combination, a dynamo-electric machine having a winding with cross connectors, a commutator, leads connecting said winding and commutator, and a ring mounted on said commutator adjacent said leads to retain the segments of the commutator and support said cross-connectors.

5. In a dynamo-electric machine, the combination of a core, a winding having cross connectors and carried thereby, a commutator, leads connecting said winding and commutator, and a ring mounted on said commutator retaining the segments thereof and supporting said cross connectors, said ring being located between said leads and core.

6. In a dynamo-electric machine, the combination of a winding, cross connectors therefor, a commutator connected to said winding, and a plurality of retaining rings mounted on said commutator, one of said rings supporting said cross connectors.

7. In a dynamo-electric machine, the combination of a winding having cross connectors, a commutator, and means mounted on said commutator for retaining the segments thereof and supporting said connectors, said means comprising relative movable engaging members.

8. In a dynamo-electric machine, the combination of a winding having cross connectors, a commutator, and relatively movable members having coöperating threaded portions and mounted on said commutator to retain the segments thereof and support said cross-connectors.

9. In a dynamo-electric machine, the combination of a winding having cross connectors, a commutator, a member mounted on said commutator retaining the segments thereof and supporting said cross connectors, and means for securing said cross-connectors to said member.

Milwaukee, Wisconsin, June 8, 1910.

In testimony whereof I affix my signature, in the presence of two witnesses.

WILLIAM H. SINGER.

Witnesses:
CHAS. L. BYRON,
ROB. E. SCOLL.

---

Copies of this patent may be obtained for five cents each, by addressing the "Commissioner of Patents, Washington, D. C."